(12) United States Patent
Frey

(10) Patent No.: US 8,172,426 B2
(45) Date of Patent: May 8, 2012

(54) BACKLIGHT SYSTEM INCLUDING FLEXIBLE LIGHT SOURCE SUPPORT

(75) Inventor: Robert M. Frey, Salt Lake City, UT (US)

(73) Assignee: Moss, Inc., Salt Lake City, UT (US)

( * ) Notice: Subject to any disclaimer, the term of this patent is extended or adjusted under 35 U.S.C. 154(b) by 248 days.

(21) Appl. No.: 12/604,727

(22) Filed: Oct. 23, 2009

(65) Prior Publication Data

US 2011/0096531 A1 Apr. 28, 2011

(51) Int. Cl.
*F21V 1/06* (2006.01)
*F21V 11/16* (2006.01)
*F21V 21/32* (2006.01)

(52) U.S. Cl. ......... 362/249.08; 362/220; 362/223; 362/225; 362/217.16; 362/240; 362/246; 362/352; 362/357

(58) Field of Classification Search ......... 362/220, 362/223, 225, 217.14, 217.16, 235, 236, 362/240, 246, 249.08, 249.11, 352, 355, 362/357; 160/84.04, 133, 264, 379, 419
See application file for complete search history.

(56) References Cited

U.S. PATENT DOCUMENTS

| | | | | |
|---|---|---|---|---|
| 471,257 A * | 3/1892 | Lorenz | ............................. | 383/39 |
| 1,937,342 A * | 11/1933 | Higbie | ........................ | 160/84.05 |
| 3,246,745 A * | 4/1966 | Stoker, Jr | ....................... | 206/419 |
| 4,564,886 A | 1/1986 | Morcheles | | |
| 4,858,763 A * | 8/1989 | Scott | ............................ | 206/419 |
| 4,901,464 A * | 2/1990 | Banoun | ........................ | 206/362 |
| 5,373,428 A | 12/1994 | Day | | |
| 5,934,468 A * | 8/1999 | Scott | ............................ | 206/418 |
| 6,042,243 A | 3/2000 | Grill et al. | | |
| 6,641,419 B1 * | 11/2003 | Richardson | ................... | 439/230 |
| 6,783,256 B2 | 8/2004 | Moon | | |
| 7,080,922 B2 | 7/2006 | Chou | | |
| 7,117,917 B2 * | 10/2006 | Allsopp | ...................... | 160/84.04 |
| 7,357,535 B2 | 4/2008 | Tsai et al. | | |
| 2008/0010878 A1 | 1/2008 | Hansen et al. | | |

* cited by examiner

Primary Examiner — Ismael Negron
(74) Attorney, Agent, or Firm — Lance M. Pritikin

(57) ABSTRACT

A flexible sheet includes a plurality of sheaths adapted to receive individual elongated light sources, and forming a collapsible backlight system having expanded and collapsed configurations. In expanded configuration, the flexible sheet is generally planar and the elongated light sources are spatially dispersed, while in the collapsed configuration, the elongated light sources are maintained proximal to each other in generally parallel fashion. The flexible sheet may have front and rear layers, each such layer possessing selected optical qualities such as translucency, reflectivity and diffusivity, depending on the desired application.

16 Claims, 4 Drawing Sheets

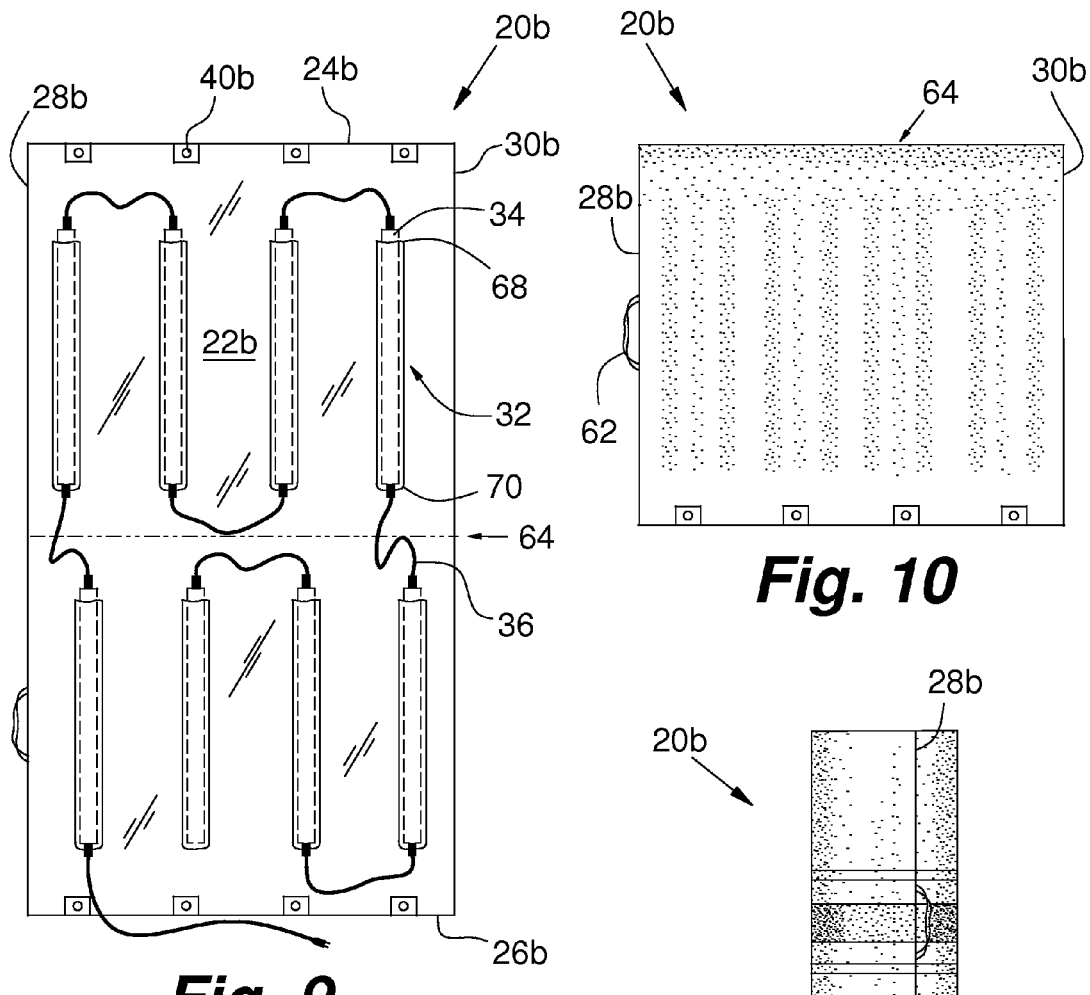
Fig. 10
Fig. 9
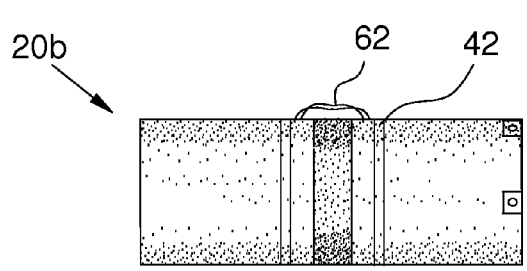
Fig. 11
Fig. 12

BACKLIGHT SYSTEM INCLUDING FLEXIBLE LIGHT SOURCE SUPPORT

RELATED APPLICATIONS

Not Applicable.

TECHNICAL FIELD OF THE INVENTION

The present invention relates generally to the field of backlight systems. More particularly, the invention concerns a collapsible backlight system for use in connection with portable display assemblies such as those commonly used for decoration and advertising in retail establishments, trade shows, and the like.

BACKGROUND OF THE INVENTION

Backlight systems are commonly used to illuminate displays in homes, museums, retail stores, airport terminals, trade show exhibits, and the like. In the trade show environment, for example, they are frequently used to illuminate preprinted display panels. In some cases, light boxes are used to simultaneously provide support for the display panel as well as the backlight system. Because backlight systems are frequently used in conjunction with portable display assemblies at trade shows, where time and space can be very limited, a preferable backlight system is one which can be easily and rapidly set up, collapsed and removed in compact form without causing injury to the more fragile components of the system.

Solutions exist for portable display backlighting systems, particularly those using fluorescent bulbs. Most such systems create an array of fluorescent bulbs by affixing the bulbs or bulb fixtures to a rigid sub frame assembly via a clip, bracket or Velcro mechanism. This generally requires that the sub frame members and the fluorescent fixtures be stored in a disassembled state and then assembled, with significant effort, when needed.

Light box assemblies that employ the attachment of light sources to non-rigid, or fabric, planar material for support purposes are known. See Hansen U.S. patent application Ser. No. 11/723,955 (Pub. No. US 2008/0010878). However, the attachment means disclosed by Hansen appear to lack characteristics that would effectively protect the attached light sources should the system be collapsed with the light sources remaining attached to the non-rigid planar material.

Those in the art have long to recognized the need for an improved backlight system that can be stored, transported, set up and used as a complete unit, without the need for assembly or disassembly, and without exposing the light sources to risk of injury in the process. Such a backlight system should also be capable of being set up and collapsed rapidly, and easily transported and stored in compact form. Further, such a system should be useful as part of a light box assembly as well as with alternative backlighting applications that do not involve a light box structure.

SUMMARY OF THE INVENTION

By way of summary, certain embodiments concern a collapsible backlight system capable of remaining in assembled form during and in transition between storage, transport, setup and use.

A collapsible backlight system for providing wide area back lighting for display assemblies comprises a flexible sheet, a plurality of elongated light sources, and expanded and collapsed configurations. The flexible sheet has a first end, a second end, a first edge and a second edge. The first and second edges generally extend from the first end to the second end. The flexible sheet includes a plurality of sheaths each adapted to substantially protectively envelope an elongated light source. Each of the plurality of elongated light sources is elongated along its respective longitudinal axis and is in substantially protectively enveloped engagement with one of the sheaths. When the collapsible backlight system is in expanded configuration, the flexible sheet is generally planar and the elongated light sources are spatially dispersed. When the collapsible backlight system is in collapsed configuration, the flexible sheet is generally non-planar and the elongated light sources are proximal to each other in generally parallel fashion. Both the expanded and collapsed configurations are adapted to allowing the elongated light sources to remain in the aforementioned substantially protectively enveloped engagement.

In certain embodiments, the sheaths each have an open end and a detaining end. The open end allows an elongated light source to pass therethrough such that an elongated light source may enter or exit a sheath through the open end of that sheath. In contrast, the detaining end prevents an elongated light source from passing therethrough such that an elongated light source may not enter or exit a sheath through the detaining end of that sheath. The detaining end feature is particularly useful in embodiments in which an elongated light source is oriented in other than substantially horizontal fashion when the collapsible backlight system is suspended in expanded configuration, in which case the detaining end prevents the elongated light source from slipping out of its respective sheath due to, for example, gravity.

In particular embodiments, each elongated light source comprises a fluorescent lamp. In such cases, each fluorescent lamp generally comprises a fluorescent bulb and a fixture element. The fixture element is generally electrically linkable with additional fixture elements.

In certain embodiments, each sheath extends in a direction generally from the first edge toward the second edge. In such cases, the sheaths and the respective elongated light sources protectively enveloped thereby are oriented approximately horizontally when the collapsible backlight system is suspended in expanded configuration. In other embodiments, each sheath extends in a direction generally from the first end toward the second end. In such cases, the sheaths and the respective elongated light sources protectively enveloped thereby are oriented approximately vertically when the collapsible backlight system is suspended in expanded configuration.

In embodiments, the elongated light sources are typically electrically interconnected. Depending on the elongated light sources used, the electrical interconnection may be in parallel or in series. Some such electrical interconnections of elongated light sources are frequently referred to as "daisy-chaining" or "linking" in the art. The electrical interconnection of the elongated light sources is especially useful in portable or tradeshow applications, as it generally requires less wiring to transport and set up.

In certain embodiments, the plurality of sheaths includes more than two sheaths. In such cases, the sheaths may be sequentially distributed in a direction from approximately the first end of the flexible sheet toward the second end of the flexible sheet, or in a direction from approximately the first edge of the flexible sheet toward the second edge of the flexible sheet.

In some embodiments, the entirety of the flexible sheet is translucent. This is particularly useful if a single collapsible backlight system is to be used to illuminate two separate displays on opposite sides of the embodiment. In further embodiments, the flexible sheet is translucent proximal the substantially protectively enveloped engagement, or immediately surrounding the elongated light sources, and may not be translucent elsewhere.

Embodiments typically comprise a suspension structure at generally the first end of the flexible sheet. The suspension structure is adapted to supporting the full weight of the collapsible backlight system while in its expanded configuration. The suspension structure may be suspendedly engaged with the upper frame component of a light box, or where a light box is not used, some other elevated structural component not an integral part of the collapsible backlight system itself. The suspension structure may comprise an elongated dowel or rod secured at generally the first end of the flexible sheet. Alternatively, or in addition, the suspension structure may comprise multiple suspension apertures projecting through the flexible sheet at generally the first end. These suspension apertures may take the form of eyelets, slits, or some other perforations. Generally such suspension apertures are reinforced as necessary to prevent tearing of the flexible sheet at the location of the suspension aperture when the embodiment is being suspended thereby.

In particular embodiments, the flexible sheet includes a front layer and a rear layer. In such embodiments, each of the sheaths may be substantially defined by discrete interstices between the front and rear layers. In such embodiments, the front layer may be substantially translucent and the rear layer substantially opaque. In other embodiments, the front layer is substantially translucent and said rear layer is substantially light reflective on the face of the rear layer adjacent the above-mentioned discrete interstices. In embodiments, the front and rear layers may be substantially comprised of multiple plies of fabric.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 9 is a diagrammatic front view of a further embodiment of a collapsible backlight system, in expanded configuration;

FIG. 10 is a diagrammatic front view of the embodiment of FIG. 9 in which the embodiment has been folded generally in half forming a first transitional configuration toward collapsed configuration;

FIG. 11 is a diagrammatic front view of the embodiment of FIG. 9 in which the embodiment has been rolled up forming a second transitional configuration toward collapsed configuration.

FIG. 12 is a diagrammatic front view of an embodiment of a collapsible backlight system of FIG. 9, shown in collapsed configuration and ready for carry;

Figure 1:
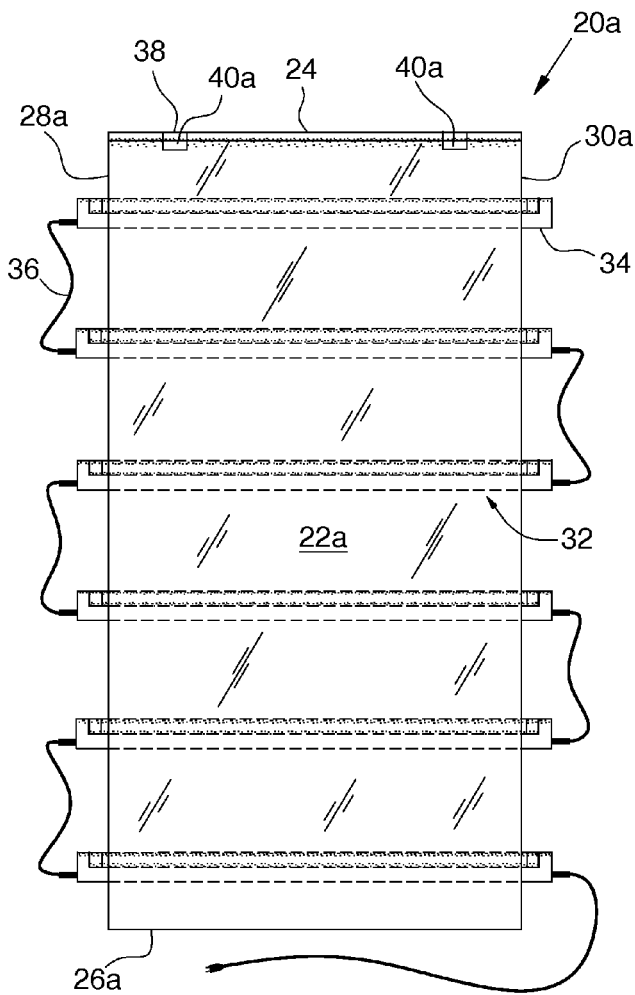
FIG. 1 is a diagrammatic front view of an embodiment of a collapsible backlight system, in expanded configuration.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE INVENTION

Figures 13, 14:
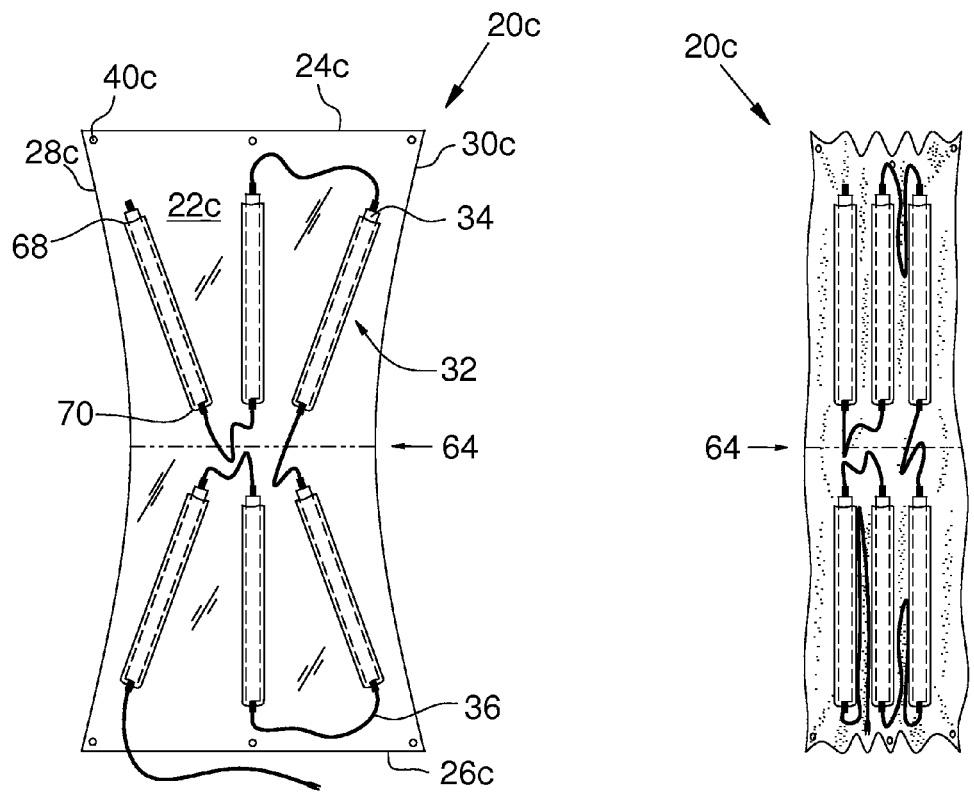
FIG. 13 is a diagrammatic front view of an additional embodiment of a collapsible backlight system, in expanded configuration and illustrating elongated light sources spatially dispersed in non-parallel fashion.
FIG. 14 is a diagrammatic front view of the embodiment of FIG. 13 in which the embodiment has been compressed to arrange the elongated light sources proximally in parallel fashion forming a first transitional configuration toward collapsed configuration.

Referring to the drawings, several embodiments of a collapsible backlight system according to the present invention are respectively shown generally at 20a, 20a, 20b and 20c. Turning to FIGS. 1, 9 and 13 for illustration, certain embodiments of a collapsible backlight system (20a, 20b and 20c) are shown in expanded configuration. A flexible sheet (22a, 22b, 22c) has a first end (24a, 24b, 24c), a second end (26a, 26b, 26c), a first edge (28a, 28b, 28c) and a second edge (30a, 30b, 30c). The first edge (28a, 28b, 28c) and the second edge (30a, 30b, 30c) generally extend from the first end (24a, 24b, 24c) to the second end (26a, 26b, 26c). As shown in FIGS. 1 and 9, for example, when a collapsible backlight system is in expanded configuration, the first edge (28a, 28b, 28c) and the second edge (30a, 30b, 30c) may be substantially linear. In alternate embodiments such as the one depicted in FIG. 13, the first edge (28a, 28b, 28c) and the second edge (30a, 30b, 30c) may be substantially non-linear, for example, tracing a more curved, wavy or jagged pathway which may conform to the particular requirements of the display form to be illuminated or the structure supporting or housing the collapsible backlight system (20a, 20b and 20c). In similar fashion, the first end (24a, 24b, 24c) and the second end (26a, 26b, 26c) may also be substantially non-linear in particular embodiments when in expanded configuration.

A flexible sheet (22a, 22b, 22c) includes a plurality of sheaths (a typical such sheath is shown at 32). Each sheath 32 is adapted to substantially protectively envelop an elongated light source (a typical such elongated light source is shown at 34). As illustrated in FIG. 1, in certain embodiments each sheath 32 extends in a direction generally from first edge 28*a* to second edge 30*a*. When such embodiments are in expanded configuration (as shown, for example, in FIG. 1), the plurality of sheaths 32 are typically sequentially distributed in a direction from approximately first end 24*a* toward second end 26*a*. In other embodiments, as illustrated for example in FIG. 9, each sheath 32 may extend in a direction generally from first end 24*b* toward second end 26*b*. When such embodiments are in expanded configuration (as shown, for example, in FIG. 9), the plurality of sheaths 32 are typically sequentially distributed in a direction from approximately first edge 28*b* toward second edge 30*b*. In yet further embodiments, as illustrated for example in FIG. 13, sheaths 32, and their respective substantially protectively enveloped elongated light sources 34, may be arranged in various non-parallel fashions when the collapsible backlight system is in expanded configuration.

Each of a plurality of elongated light sources 34 are in substantially protectively enveloped engagement with a sheath 32. In individual embodiments, the plurality of elongated light sources 34 may be electrically interconnected in series, in parallel, or a combination thereof. Such interconnections may be made by one or more connector cables (examples of which are shown at 36). In certain embodiments, elongated light source 34 may comprise a fluorescent lamp. Such a fluorescent lamp would typically comprise a fixture element and a fluorescent bulb element. The substantially protectively enveloped engagement helps ensure that, with no need to disassemble collapsible the backlight system, the elongated light sources 34 remain undamaged throughout storage, transportation, setup and use of the collapsible backlight system.

Embodiments may comprise a suspension structure located generally at the first end (24*a*, 24*b*, 24*c*). The suspension structure may be adapted to support the full weight of the collapsible backlight system while in expanded configuration, or a significant portion of that weight. Turning to FIGS. 1, 9 and 13, the suspension structure may be defined by an elongated dowel 38, multiple suspension apertures (40*a*, 40*b* and 40*c*), or a combination thereof.

Figure 7:
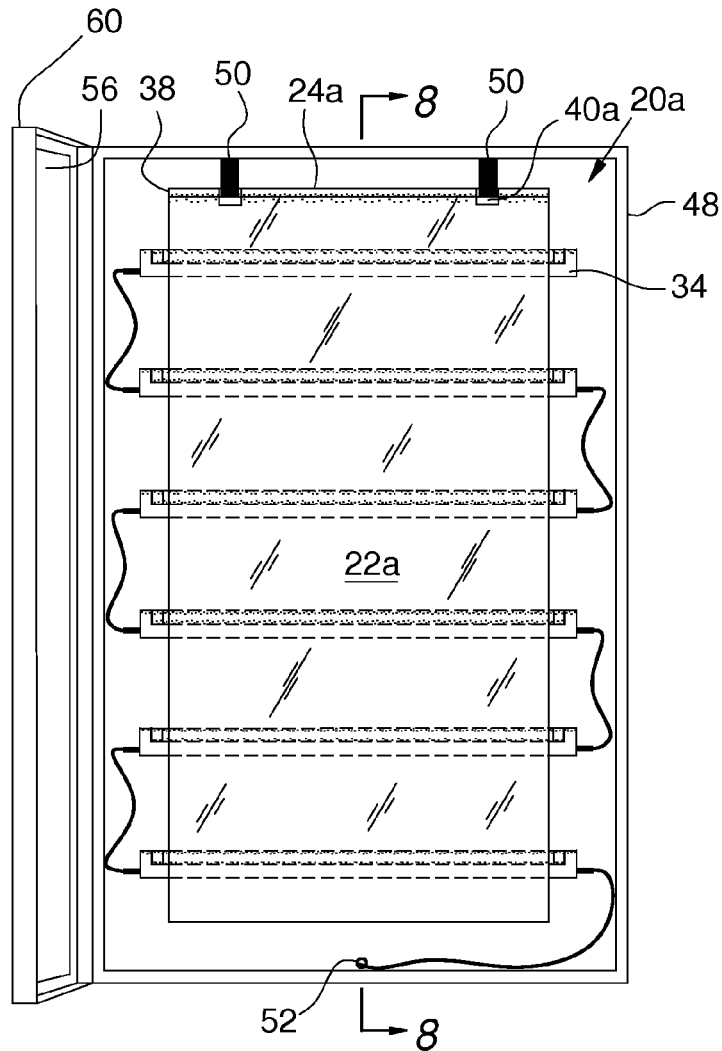
FIG. 7 is a diagrammatic front perspective view depicting an embodiment of a collapsible backlight system employed as part of a light box assembly.
Figure 8:
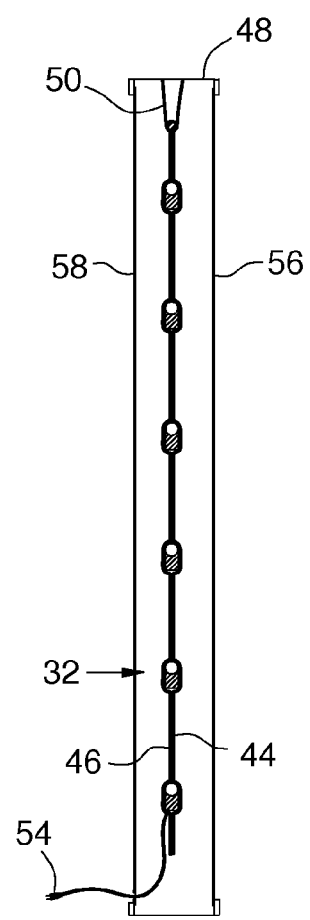
FIG. 8 is a diagrammatic cross-sectional view taken along line 8-8 of FIG. 7.

FIGS. 7 and 8 depict a light box 48 within which a collapsible backlight system 20*a* is suspended by way of hanger elements 50. In such an application, light box 48 acts as the support structure for collapsible backlight system 20*a*, the support structure being supportingly associated with the suspension structure of the embodiment by way of, for example, hanger element 50. Hangar elements 50 can be straps, hooks, cables, ropes, or other conventionally known support components. Further, it should be noted that collapsible backlight system (20*a*, 20*b* and 20*c*) can be used to provide backlighting for displays and images that are not directly associated with a light box, in which case the embodiment can be suspended from, for example, a ceiling or other load-bearing framework. In embodiments in which elongated light sources 34 each comprise a fluorescent bulb and linkable fixture, no separate fluorescent light ballasts are required. Rather, the entire system can be powered by directly plugging power plug 54 into a wall outlet or a standard energized power strip. In FIG. 7, access door 60 of light box 48 is shown in open position. Power plug 54 is shown passed through plug aperture 52.

Figure 2:
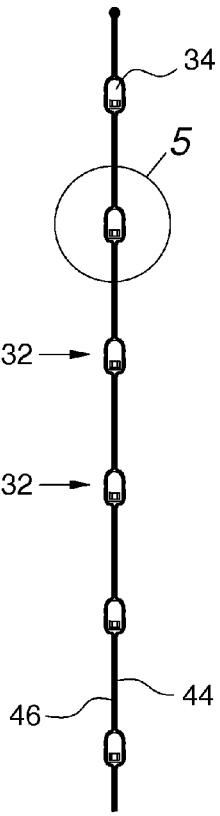
FIG. 2 is a diagrammatic side view of the embodiment of FIG. 1 wherein the front and rear layers of the sheet both extend from generally the first end to the second end, the plurality of sheaths being defined by discrete interstices disposed between the rear layer and the front layer.
Figure 3:
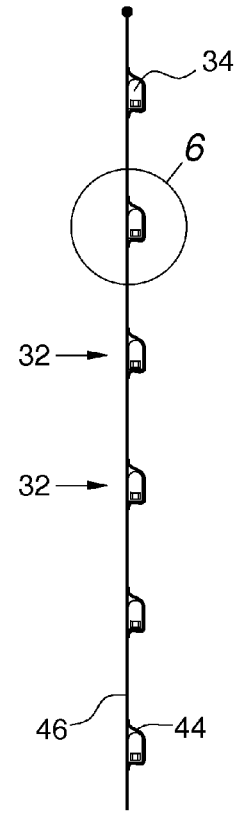
FIG. 3 is a diagrammatic side view of an embodiment similar to that of FIG. 1 but wherein the front layer of the sheet is divided into individual strips, the plurality of sheaths each being defined by a discrete interstice disposed between the rear layer and a strip of the front layer.
Figure 5:
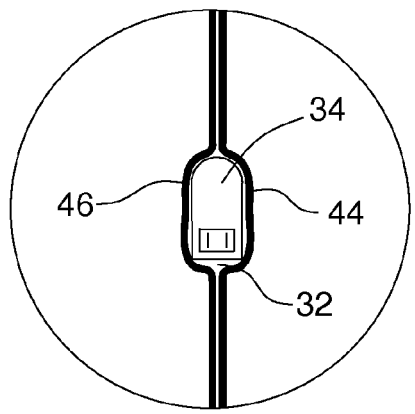
FIG. 5 is a diagrammatic enlarged view of detail 5 of FIG. 2.
Figure 6:
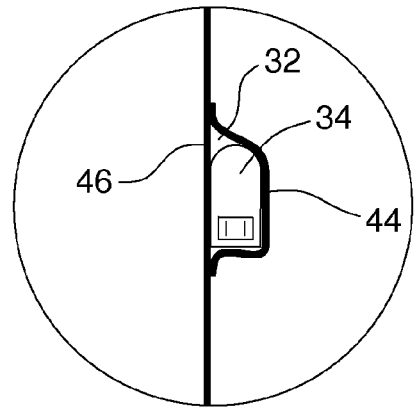
FIG. 6 is a diagrammatic enlarged view of detail 6 of FIG. 3.

As illustrated in FIGS. 5 and 6, in embodiments of a collapsible backlight system (20*a*, 20*b* and 20*c*), the flexible sheet (22*a*, 22*b* and 22*c*) may include a front layer 44 and a rear layer 46. In some such embodiments, each sheath 32 is substantially defined by a discrete interstice between front layer 44 and rear layer 46. In embodiments with a front and rear layer, both front layer 44 and rear layer 46 may extend substantially from the first end (24*a*, 24*b* and 24*c*) to the second end (26*a*, 26*b* and 26*c*) (see, for example, FIGS. 2 and 5). Alternatively, one layer may be divided into individual strips secured to the other layer by way of stitching, adhesive, or similar conventional securing operation (see, for example, FIGS. 3 and 6, which depict front layer 44 divided into individual strips).

In some embodiments, substantially all of the flexible sheet (22*a*, 22*b*, 22*c*) may possess a selected degree of translucency or diffusivity. Alternatively, in other embodiments, the flexible sheet may be translucent only proximal the substantially protectively enveloped engagement, or immediately surrounding elongated light sources 34, and opaque or diffusive elsewhere. In embodiments in which the flexible sheet (22*a*, 22*b*, 22*c*) is at least partially diffusive, the diffusivity causes a spreading of the transmitted light from elongated light sources 34 throughout the flexible sheet, which in turn provides a more even backlighting of the display panel or other object to be illuminated (see, for example, front display panel 56 and rear display panel 58 in FIG. 8).

Depending on the intended use of an embodiment with a front and rear layer, the translucency, diffusivity and reflectivity of front layer 44 and rear layer 46 may differ. Returning to FIGS. 7 and 8, in embodiments intended to be used to back illuminate only one display panel (for example, front display panel 56), front layer 44 may be substantially translucent and rear layer 46 may be substantially opaque. In embodiments intended to be used to back illuminate display panels on both sides of a two-sided light box display (for example, front display panel 56 and rear display panel 58), both front layer 44 and rear layer 46 may be substantially translucent. To help optimize the efficient illumination of the side of a light box display adjacent front layer 44, front layer 44 may be substantially translucent and rear layer 46 may be substantially light reflective on the face of rear layer 46 adjacent the discrete interstices. In certain embodiments with front and rear layers, each of front layer 44 and rear layer 46 may be substantially comprised of multiple plies of fabric, each ply selected to contribute particular desired optical and structural characteristics to the collapsible backlight system.

Figure 4:
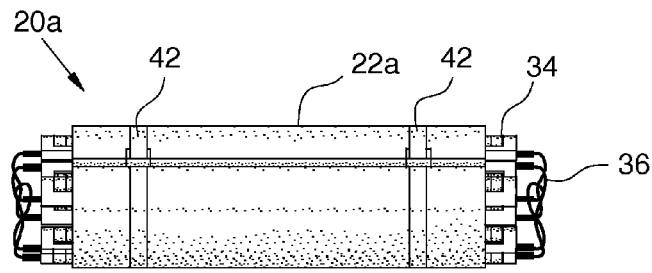
FIG. 4 is a diagrammatic front view of an embodiment of a collapsible backlight system of FIG. 1, shown in collapsed configuration.
Figures 15, 16:
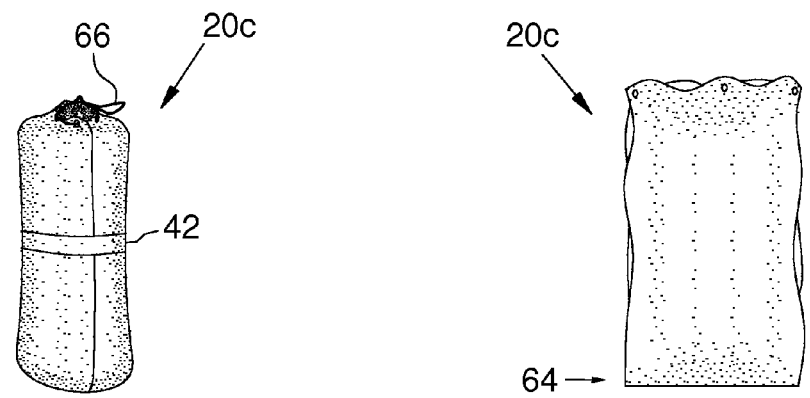
FIG. 15 is a diagrammatic front view of the embodiment of FIG. 13 in which the embodiment has been folded generally in half forming a second transitional configuration toward collapsed configuration.
FIG. 16 is a diagrammatic front view of an embodiment of a collapsible backlight system of FIG. 13, shown in collapsed configuration and ready for carry.

Each embodiment of a collapsible backlight system comprises an expanded configuration and a collapsed configuration. Importantly, the collapsible backlight system is able to remain fully assembled while in, and throughout the transition between, these configurations. FIGS. 1, 9 and 13 each depict a distinctive embodiment of a collapsible backlight system (20*a*, 20*b*, and 20*c*, respectively) in expanded configuration. When a collapsible backlight system is in expanded configuration, the flexible sheet (22*a*, 22*b* and 22*c*) is generally planar and elongated light sources 34 are spatially dispersed. FIGS. 4, 12 and 16 depict the same embodiments depicted in FIGS. 1, 9, and 13, but in their respective collapsed configurations. When collapsible backlight system (20*a*, 20*b* and 20*c*) is in collapsed configuration, the flexible sheet (22*a*, 22*b* and 22*c*) is generally non-planar, and elongated light sources 34 are proximal to each other in generally parallel fashion.

Certain embodiments of a collapsible backlight system (20*a*, 20*b* and 20*c*) may comprise transitional configurations between the expanded and collapsed configurations. For example, FIGS. 9-12 and 13-16 respectively depict the transition of two separate embodiments of a collapsible backlight system (20*b* and 20*c*) between expanded configuration (see FIGS. 9 and 13, respectively) and collapsed configuration (see FIGS. 12 and 16, respectively). First transitional configurations are shown at FIGS. 10 and 14, respectively. Second transitional configurations are shown at FIGS. 11 and 15, respectively.

FIGS. 9-12 collectively depict one embodiment of a collapsible backlight system 20b in transition between expanded configuration and collapsed configuration. FIG. 9 shows the embodiment in expanded configuration. FIG. 10 shows the embodiment of FIG. 9 in a first transitional configuration, wherein flexible sheet 22b is folded approximately in half across fold line 64. FIG. 11 illustrates a second transitional configuration wherein the embodiment precedingly in its first transitional configuration has now been rolled up in a direction generally from second edge 30b toward first edge 28b. Finally, FIG. 12 depicts the same embodiment of FIG. 9, but in collapsed configuration, capable of being carried by way of, for example, carrying strap 62. Strap 42, or a conventional equivalent such as an elastic band, belt, string, rope, latch, tape, hook or Velcro joint may be used to further secure the embodiment in collapsed configuration for transportation and storage purposes.

FIGS. 13-16 collectively depict another embodiment of a collapsible backlight system 20c in transition between expanded configuration and collapsed configuration. FIG. 13 shows the embodiment in expanded configuration. FIG. 14 shows the embodiment of FIG. 13 in a first transitional configuration, wherein the elongated light sources 34 have been gathered proximal to each other in generally parallel fashion. FIG. 15 illustrates a second transitional configuration wherein the embodiment precedingly in its first transitional configuration has now been folded approximately in half across fold line 64. Finally, FIG. 16 depicts the same embodiment of FIG. 13, but in collapsed configuration, wherein a draw string 66 has been placed through suspension apertures 40c and tightened to secure the embodiment in collapsed configuration while simultaneously providing a carrying loop. Again, strap 42, or a conventional equivalent thereof, may be used to further secure the embodiment in collapsed configuration for transportation and storage purposes.

Turning now to FIGS. 9 and 13, in certain embodiments, sheaths 32 include an open end 68 and a detaining end 70. Open end 68 allows an elongated light source 34 to pass therethrough so as to enter and exit sheath 32. Detaining end 70 prevents an elongated light source 34 from passing therethrough so as to preclude an elongated light source 34 from exiting a sheath 32 as a result of, for example, the force of gravity. In certain embodiments, detaining ends 70 include access holes large enough to allow the insertion and removal of a connector cable 36.

The detailed description of embodiments of the collapsible backlight system is intended to serve merely as examples, and is in no way intended to limit the scope of the appended claims to these described embodiments. Accordingly, modifications to the embodiments described are possible, and it should be clearly understood that the invention may be practiced in many different ways than the embodiments specifically described below, and still remain within the scope of the claims.

The invention claimed is:

1. A collapsible backlight system for providing wide area back lighting for display assemblies, said collapsible backlight system comprising:
   a flexible sheet having a first end, a second end, a first edge and a second edge, said first and second edges generally extending from said first end to said second end, said flexible sheet including a plurality of sheaths each adapted to substantially protectively envelope an elongated light source;
   a plurality of elongated light sources, each of said elongated light sources being elongated along its longitudinal axis and being in substantially protectively enveloped engagement with one of said sheaths, said plurality of elongated light sources being electrically interconnected in series or parallel; and
   an expanded configuration and a collapsed configuration, said flexible sheet being generally planar and said elongated light sources being spatially dispersed in said expanded configuration, said flexible sheet being generally non-planar and said elongated light sources being proximal to each other in generally parallel fashion in said collapsed configuration, both said expanded and collapsed configurations adapted to allowing said elongated light sources to remain in said substantially protectively enveloped engagement.

2. A collapsible backlight system as defined in claim 1 in which said sheaths each have an open end and a detaining end, said open end allowing said elongated light source to pass therethrough, said detaining end preventing said elongated light source from passing therethrough.

3. A collapsible backlight system as defined in claim 1 in which each said elongated light source comprises a fluorescent lamp.

4. A collapsible backlight system as defined in claim 1 in which each said sheath extends in a direction generally from said first edge toward said second edge.

5. A collapsible backlight system as defined in claim 1 in which each said sheath extends in a direction generally from said first end toward said second end.

6. A collapsible backlight system as defined in claim 1 in which said plurality of sheaths includes more than two sheaths, said sheaths being sequentially distributed in a direction from approximately said first end toward said second end.

7. A collapsible backlight system as defined in claim 1 in which said plurality of sheaths includes more than two sheaths, said sheaths being sequentially distributed in a direction from approximately said first edge toward said second edge.

8. A collapsible backlight system as defined in claim 1 in which said flexible sheet is translucent.

9. A collapsible backlight system as defined in claim 1 in which said flexible sheet is translucent proximal said substantially protectively enveloped engagement.

10. A collapsible backlight system as defined in claim 1 further comprising a suspension structure at generally said first end, said suspension structure adapted to supporting the full weight of said collapsible backlight system while in said expanded configuration.

11. A collapsible backlight system as defined in claim 10 in which said suspension structure comprises an elongated dowel secured at generally said first end.

12. A collapsible backlight system as defined in claim 10 in which said suspension structure comprises multiple suspension apertures projecting through said flexible sheet at generally said first end.

13. A collapsible backlight system as defined in claim 1 in which said flexible sheet includes a front layer and a rear layer, each said sheath being substantially defined by discrete interstices between said front and rear layers.

14. A collapsible backlight system as defined in claim 13 in which said front and rear layers are substantially comprised of multiple plies of fabric.

15. A collapsible backlight system as defined in claim 13 in which said front layer is substantially translucent and said rear layer is substantially opaque.

16. A collapsible backlight system as defined in claim 13 in which said front layer is substantially translucent and said rear layer is substantially light reflective on the face of said rear layer adjacent said discrete interstices.

* * * * *